(No Model.) 3 Sheets—Sheet 1.
J. H. JENKINS.
CONTROLLER FOR ELECTRIC MOTORS.

No. 524,385. Patented Aug. 14, 1894.

Witnesses
A. F. Macdonald
J. H. Livermore

Inventor
Joseph H. Jenkins
By Bentley & Blodgett
Attys.

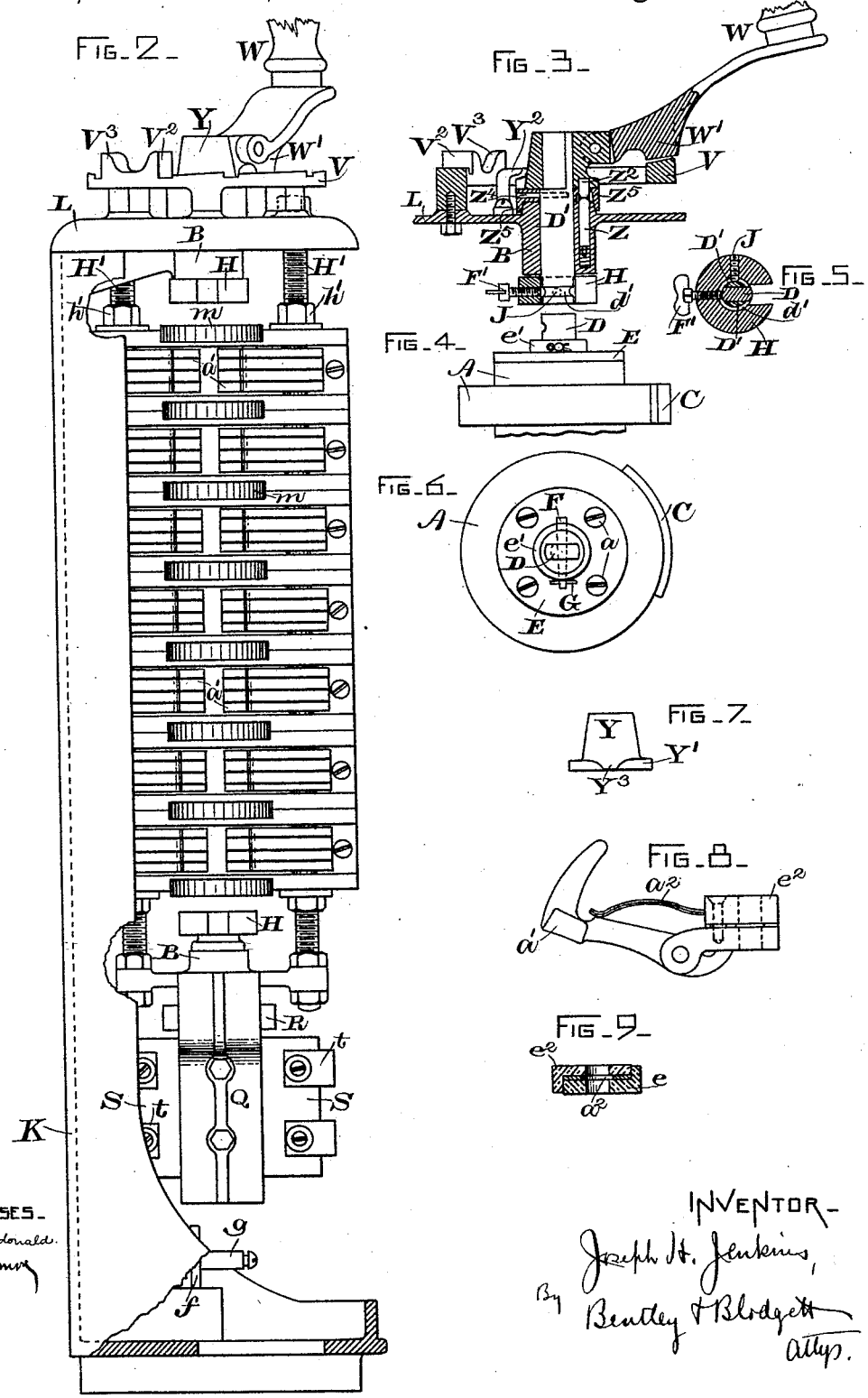

(No Model.)  3 Sheets—Sheet 3.

J. H. JENKINS.
CONTROLLER FOR ELECTRIC MOTORS.

No. 524,385.  Patented Aug. 14, 1894.

WITNESSES
A. F. Macdonald
J. H. Livermore

INVENTOR
Joseph H. Jenkins,
By Bentley & Blodgett
Attys.

UNITED STATES PATENT OFFICE.

JOSEPH H. JENKINS, OF LYNN, ASSIGNOR TO THE GENERAL ELECTRIC COMPANY, OF BOSTON, MASSACHUSETTS.

CONTROLLER FOR ELECTRIC MOTORS.

SPECIFICATION forming part of Letters Patent No. 524,385, dated August 14, 1894.

Application filed February 3, 1894. Serial No. 498,955. (No model.)

*To all whom it may concern:*

Be it known that I, JOSEPH H. JENKINS, a citizen of the United States, residing at Lynn, county of Essex, State of Massachusetts, have invented certain new and useful Improvements in Controllers for Electric Motors, of which the following is a specification.

My invention relates to controllers for electric motors and consists in certain improvements in mechanical construction which render the apparatus compact and convenient of operation, and which also admit of the ready exposure or removal of the essential parts for inspection or repair.

My invention is especially applicable to that form of controller known as the "series parallel" controller, but is not limited to such use since the features of novelty can be equally well applied to a controller of any type.

Briefly my invention comprises a circuit-controlling switch preferably cylindrical in form, a reversing switch co operating therewith, a removable actuator common to both, locking devices preventing the removal of said actuator except at a certain predetermined position of the circuit - controlling switch, and also for preventing any movement thereof when said actuator is detached, and means for removing the circuit-controlling switch and thereby rendering the other parts of the apparatus, as well as the switch itself, accessible without the necessity of removing said other parts from their fixed position in the assembled apparatus.

The device as a whole is inclosed in a casing preferably rectangular in shape, which may be fastened to the dash-board on the platform of the car, when railway motors are to be controlled, and the parts are so arranged therein that the width of the case is inconsiderable, so that the said case lying flatwise against the dash-board occupies but little space. The actuator moreover is situated at the left side of the case, thus bringing the bulk of the apparatus in front of the motorman and out of the way of passengers.

Figure 1:
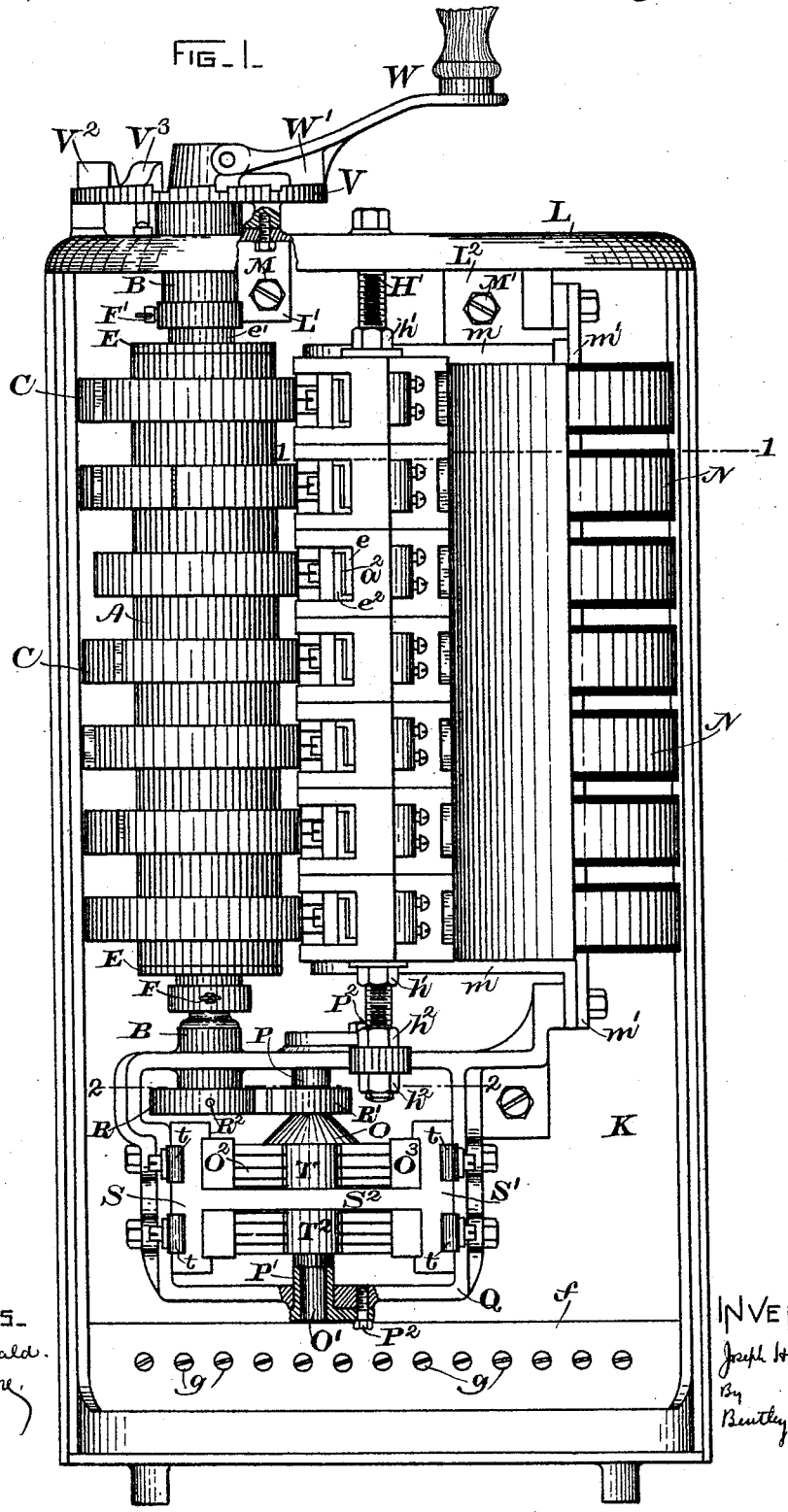
Figure 10:
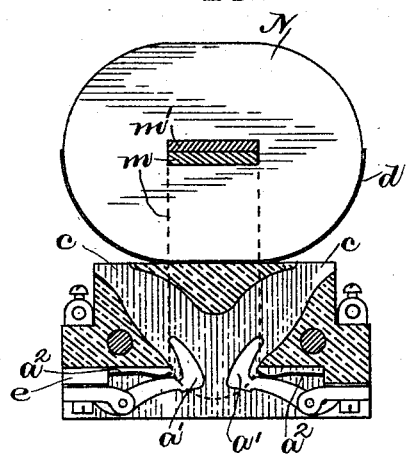
Figure 11:
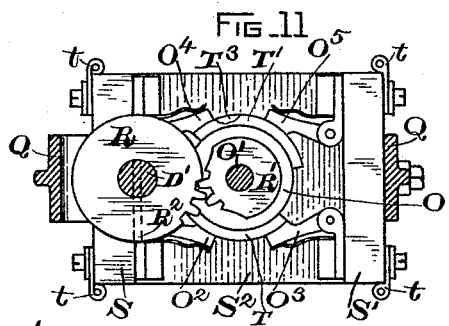
Figure 13:
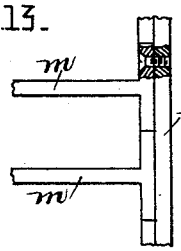
Figure 12:
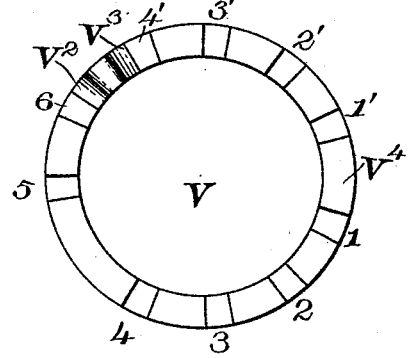

In the accompanying drawings, Figure 1 is a front elevation of my controller with the sheet iron cover removed. Fig. 2 is a side elevation with the circuit controlling switch removed. Fig. 3 is a section through the handle showing the locking devices. Figs. 4, 5 and 6 are details of the cylinder and means for fastening the same in position. Fig. 7 is a rear view of the handle sockets. Figs. 8 and 9 are details of the contact brushes. Fig. 10 is a section on the line 1—1 of Fig. 1. Fig. 11 is a section on the line 2—2 of Fig. 1. Fig. 12 is a plan view of the step-by-step device, and Fig. 13 a detail of the pole pieces for the blow-out magnets.

Referring to the said drawings, the cylinder A which forms the moving member of the circuit controlling switch is attached to and carried by the shafts D' mounted in suitable bearings B, B, and is made of any suitable insulating material, upon the surface of which contacts C are suitably fastened. In the spaces between the said contacts the cylinder is turned down to a smaller diameter so that there will be less chance of arcing between the contacts. The said cylinder A is mounted on a shaft D and is rigidly attached thereto in any suitable manner. I prefer to use the annular plates E, E which surround the shaft D near the ends thereof, and which are fastened by means of screws, $a$, Fig. 6, to the ends of the cylinder. The said plates are provided with a raised flange $e'$ fitting closely around the shaft D and secured thereto by means of a taper pin F which is held in position by a split pin G. The shaft D, having the switch cylinder thus secured to it, is flattened at top and bottom, as best shown in Figs. 5 and 6, and the two supplemental shafts D' above mentioned, permanently secured in the bearings B, B, are transversely slotted to receive the flattened ends of the main shaft D. A slotted ring or collar H surrounds the said supplemental shaft, and serves to lock the two shafts together.

Fig. 5 shows in section the two shafts and the ring in such position that the respective slots therein register so that the cylinder may be inserted or removed. Referring to this figure, it will be seen that if the collar H is turned in either direction, the main portion thereof will close the slot in the shaft D' and lock the shaft D therein. Screws F' and J are provided which engage with an annular groove $d'$ in the shaft D', the former serving as a set-screw to hold the collar in the desired position, and the latter to prevent the collar from dropping off when the set-screw is loosened and the cylinder removed.

The circuit controlling switch is arranged to operate in both directions; that is to say a movement of the actuator or handle in one direction from the neutral or "off" position controls the operation of the motors in a forward direction, while an opposite movement controls the motors in the opposite direction. There are however no cross-connections on the switch-cylinder, but a reversing switch is employed and adapted to be operated by the main switch, as follows: Referring to Figs. 1 and 12, the actuator W, detachably fastened to the shaft or spindle D', as will be hereinafter more fully described, is adapted to rotate the cylinder in either direction between the lugs V² and V³ on the notched ring V. The notches are so arranged as to determine the successive running-positions of the motor. Thus referring especially to Fig. 12, if the lug W' on the under side of the actuator, rests in the notch 1, the motors are cut out, but a movement of the actuator to the left into notch 2 causes them to go ahead at slow or starting speed. Further movement in the same direction through notches 3, 4, 5 and 6 gradually brings the motors to full speed. A movement to the right however from the notch 1 to notch 1' makes no change in the motor-circuit, the said circuit still remaining open, but by means of a suitable gear this movement operates the reversing switch, and a further movement through notches 2' and 3' to 4' starts and gradually accelerates the motors, now reversed, as before. Only four running positions are provided for in the backward direction, since in railway work two controllers are applied to each car, and it is not contemplated to control from the rear but only to provide means for backing in case of an emergency such as the missing of a switch.

The reversing switch above mentioned comprises a cylinder made up of suitable insulating material, which cylinder is mounted on the shaft O'. Said shaft O' is provided with suitable bushings P, P' held in place by bolts or screws P². The bearing is thus simple in construction so that the frame Q which supports the reversing switch and the lower end of the main switch can be cast in one piece, and the reversing switch cylinder inserted without having any nice fitting joints made for bearing caps. The brushes O², O³, O⁴ and O⁵ which engage with the contacts on said cylinder are mounted on suitable blocks S, S' and the upper brushes are separated from the lower by means of the insulating partition S². On the cylinder O are mounted four copper segments T, T', T², T³, which form the contacts above mentioned, on which the brushes O², O⁵ rest. Suitable binding-posts t are provided on which the connections are taken to the motors.

Referring to Fig. 11, the gears connecting the main and reversing switches are shown in the position which they occupy when the main switch cylinder is in the position determined by the notch 1 as above described. The gear R fastened to the shaft D' by means of a pin R² or otherwise is provided with two teeth, as shown, which mesh with two corresponding teeth on the gear R'. When therefore the main switch cylinder is moved from the position determined by notch 1 to that determined by notch 1', the gear R' will be turned from left to right (Fig. 11) until the segment T' connects the brushes O⁵ and O³ instead of O⁴ and O⁵, and the remaining connections are correspondingly changed as need not be specifically described, thus reversing the motors. As the controller is worked from the position shown or from the corresponding position with the motors reversed, a slight further movement of the reversing switch cylinder will follow without changing the circuit connections until the parts of the gear R' next to the teeth, which are concaved on the same radius as that of the gear wheel R, coincide with the circumference of said wheel. It is evident that this will admit of a further movement of the main switch cylinder in controlling the motors but at the same time will prevent a further movement of the reversing switch.

The casing K is made of any suitable cast metal and the cover L is provided with lugs L', L² fastened to said casing by means of screws M, M'. To the back of said casing are suitably fastened the various parts above described, together with the brushes of the circuit-controlling switch and a series of blow-out magnets adjacent thereto and serving as arc-extinguishers. Said brushes $a'$ are mounted in separate cells or boxes made of insulating material and the cells are then fastened together by means of two long bolts H' passing through the cover L and frame Q. These bolts are provided with nuts $h'$ to hold the cells together and are also provided with nuts $h^2$ by which they are adjusted in relation to the said cover and frame and secured thereto. The brushes themselves are each made up of a number of independent fingers in order to insure a good contact with the plates C upon the rotating cylinder. Springs $a^2$, Fig. 8, serve to press said brushes firmly against the said contacts and these springs are insulated by means of the L-shaped pieces $e$, $e^3$ shown in detail in Fig. 9. Instead of putting bushings around the screws, I prefer to make the holes in the metal somewhat larger allowing the screws to pass therethrough without making contact. The binding posts $g$ are fastened to a piece of insulating material $f$, Figs. 1 and 2, in the lower part of the case K. These binding posts are connected permanently to the brushes of the controller so that it is only necessary to connect the wires leading directly from the motors.

The core of the blow-out magnets consists of a long iron bar $m'$ bolted to a lug L² near the top of the case K and also to the frame Q, and to the said bar $m'$ are screwed T-shaped pieces of iron $m$, the stems of which extend toward the brushes $a'$, as shown in Fig. 10. These projecting stems form the poles of the magnet, thus bringing the maximum magnetic effect into close proximity to the brushes. The bobbins for the magnets consist of copper ribbons so wound that they form alternately north and south poles. When the contact is broken between two of the brushes $a'$ the arc which follows is forced out toward the ends of the brushes under the influence of the magnetic field, and is finally extinguished. The gases formed pass out through the opening $c$, best shown in Fig. 10. To protect the insulation of the coils N a sheet of asbestos paper $d$ is wrapped partially around it.

For actuating the movable parts of the device which are contained within the case, as above described, a detachable actuator or handle W, shown in Figs. 1, 2, 3 and 7, is capable of being attached and detached at will to the upper shaft or spindle $D'$ in the following manner: A socket Y having at its lower end a flange $Y'$ is adapted to fit over the projecting end of the shaft $D'$, so as to turn the said shaft. An L-shaped projection $Y^2$ is fastened to the cover L in such a position that when the socket is in place upon the shaft the flange $Y^2$ will be engaged by said projection and the socket thus held in place. A slot $Y^3$, Fig. 7, is however cut in said flange, of such size that the said projection may be passed therethrough, and the slot and projection are so arranged that they register only when the controller is in the "off" position with the actuator midway between the slots 1 and $1'$ in the guide V as hereinbefore set forth. Thus, as soon as the actuator is moved from this position, it becomes impossible to disengage it from the shaft, and its removal is possible only when the motors are not running. In order to lock the controller when the handle is removed, a spring-actuated pin Z in the cover L is adapted to project into a small hole in an annular disk $Z^5$ secured to the shaft $D'$ by a pin $Z^4$ or otherwise. The said hole is so situated as to come opposite the end of the pin Z when the controller is in the center of the neutral space $V^4$, or in other words, at the time when the actuator may be removed. The said actuator is provided with a pin $Z^3$ adapted to push the pin Z out of the hole in the disk $Z^5$ and take its place therein, thus unlocking the shaft and rendering the controller operative. The actuator can obviously be attached only when the pin $Z^2$ is opposite the hole in the disk $Z^5$ and the slot $Y^3$ opposite the projection $Y^2$, simultaneously, and this occurs only when the controller is in the neutral position above described. The disk $Z^5$ is provided with a flange fitting closely over the bearing B and serves as a dust cap therefor.

In the operation of a motor controller such as the one herein described, it is desirable to provide some step-by-step arrangement in order to guard against the sudden increase of speed which would occur if the actuating handle were suddenly moved from a slow to a high speed point. At the same time however a rapid movement in an opposite direction in order to stop the motors when going at any rate of speed, is essential. For this purpose the actuator or handle W is hinged to the socket Y, and the metal between the notches in the ring V which is engaged by the lug $W'$ upon the said handle is given a slight bevel from left to right so that the said lug $W'$ will drop in the several slots as it moves from "off" to "on" positions, thus rendering it necessary to lift the handle as it passes each notch. As it moves in the opposite direction however, since the left hand side of the notch is higher than the right, the handle, when moved quickly, will jump from one to the other without dropping into the slot, so that the current may be cut off by a single uninterrupted movement.

I do not intend to limit myself to the exact construction herein set forth, as I believe certain features of the device to be broadly new and many modifications might be made without departing from the spirit of my invention.

What I claim new, and desire to secure by Letters Patent of the United States, is—

1. A controller for electric motors comprising an actuating shaft or spindle mounted in suitable bearings, a circuit modifying device carried by said shaft, and means for removing such device from the shaft, without removing the shaft from its bearings, as set forth.

2. A controller for electric motors, comprising a set of fixed contacts, a cylinder carrying contacts adapted to engage said fixed contacts, an inclosing case for said parts, an actuating shaft or spindle having a bearing in said case, and means for attaching said cylinder to or detaching it from said shaft at will, as set forth.

3. In a controller for electric motors having a current-controlling cylinder and a reversing cylinder, a gear comprising a disk concentric with the current-controlling cylinder, teeth cut in a portion of the periphery thereof, a second disk concentric with the reversing cylinder, teeth cut on the periphery thereof corresponding to and adapted to mesh with the teeth on the first disk, and concave portions on the periphery of said second disk adjacent to the teeth therein and shaped to engage with and conform to the uncut portion of the periphery of the first disk, as and for the purpose set forth.

4. In a controller for electric motors comprising a set of fixed contacts and a set of movable contacts, an electro-magnet or series of electro-magnets comprising a bobbin or bobbins wound on a core consisting of a series of T-shaped pieces, the top portions of said pieces forming the core proper upon which the bobbins are wound, and the stems thereof extending outwardly between the said bobbins toward the contacts and forming pole-pieces, as and for the purpose set forth.

5. The herein described core for an electro-magnet or series of electro-magnets, comprising a flat strip of metal, and a series of T-shaped pieces of metal having their top portions screwed or otherwise fastened to said strip, so that the stems of the T's project therefrom at right angles.

6. A controller for electric motors comprising a shaft or spindle and means for rotating the same, a permanent bearing therefor, a second shaft or spindle in line therewith having a separate bearing, gearing carried by said second shaft and adapted to operate a reversing switch, a circuit-controlling switch cylinder, and means for connecting said cylinder to said shafts, substantially as described.

7. In a controller for electric motors, a circuit controlling switch-cylinder mounted on a shaft having a flattened portion at each end extending beyond the ends of the cylinder, supplementary shafts having permanent bearings in the casing or framework of the controller, slots in said supplementary shafts in which the flattened ends of the cylinder shaft are adapted to fit, and slotted collars surrounding said supplementary shafts, as and for the purpose set forth.

8. In a controller for electric motors comprising controlling and reversing switch cylinders, substantially as described, an actuator therefor, consisting of a socket adapted to fit the shaft which carries the cylinder, and a handle hinged to or pivoted on said socket, in combination with a rack or guide extending through the path of said handle, and a series of notches therein adapted to engage and retain said handle at certain predetermined positions, as set forth.

9. In a controller for electric motors, the combination with a hinged or pivoted operating handle, of a rack or guide adapted to be engaged thereby during the movement thereof, notches in said guide adapted to retain said handle, and beveled projections between the notches, as and for the purpose set forth.

10. A detachable actuator for a controller, comprising a socket provided with a lever handle and adapted to fit the spindle of the switch-cylinder, a flange upon said socket, projection attached to a fixed portion of the controller, such as the inclosing case, and adapted to engage said flange, and a slot in said flange through which said projection can pass, as and for the purpose described.

11. In a controller for electric motors, a locking device comprising a cap or flange integral with or fastened to the controller-shaft or spindle, a pin spring-pressed against said flange, and a hole or perforation in the flange adapted to come opposite said pin and be engaged thereby at a predetermined position of the spindle, as and for the purpose set forth.

12. A detachable operating-device and lock for an electric controller, comprising a flange or collar surrounding the controller shaft or spindle, a perforation therein, a spring-actuated pin or detent engaging with said perforation when the spindle is in a predetermined position, a socket provided with an actuating handle and adapted to fit the end of said spindle and engage with said flange, and a projection on said socket adapted to engage the said perforation and displace the spring-actuated pin, thus unlocking the spindle, substantially as and for the purpose described.

13. A detachable operating-device and lock for an electric controller, comprising a flange or collar surrounding the controller shaft or spindle, a perforation therein, a spring-actuated pin or detent engaging with said perforation when the spindle is in a predetermined position, a socket provided with an actuating handle and adapted to fit the end of said spindle and engage with said flange, and a projection on said socket adapted to engage the said perforation and displace the spring-actuated pin, in combination with a slotted flange integral with the said socket, and a fixed projection engaging said flange, as and for the purpose set forth.

Signed at Lynn, Massachusetts, this 1st day of February, 1894.

JOSEPH H. JENKINS.

Witnesses:
JOHN W. GIBBONEY,
HENRY O. WESTENDARP.